3,427,703
LENS CENTRATION MOUNTING PROCESS AND APPARATUS

Filed Sept. 1, 1965

RICHARD K. BAADE
INVENTOR.

BY Frank C. Parker

ATTORNEY

RICHARD K. BAADE
INVENTOR.

BY *Frank C. Parker*

ATTORNEY

United States Patent Office 3,427,703
Patented Feb. 18, 1969

3,427,703
LENS CENTRATION MOUNTING PROCESS AND APPARATUS
Richard K. Baade, North Chili, N.Y., assignor to Bausch & Lomb Incorporated, Rochester, N.Y., a corporation of New York
Filed Sept. 1, 1965, Ser. No. 484,378
U.S. Cl. 29—406  6 Claims
Int. Cl. B23q 17/00; B23p 19/02; B29d 11/00

ABSTRACT OF THE DISCLOSURE

Method and apparatus for mounting a lens permanently in a lens mounting cell so that the optical axis thereof is truly aligned and is concentric with the exterior mounting surfaces of said cell, those surfaces being machined with the cell in its aligned position during one of the steps of the method.

---

The present invention relates to a method and apparatus for mounting a lens in a mounting cell in true alignment and concentricity with the mounting surfaces of said cell and more particularly it relates to improvements in the method and apparatus.

Because of the upgrading of performance criteria of optical systems generally in recent years, the mounting of the lenses which are comprised in such systems becomes increasingly difficult. In an effort to meet the current higher performance criteria, the optical industry has found it necessary to adopt new techniques, methods and apparatus for mounting lenses. The proper centration and alignment of lenses of all forms in a precise manner relative to the mounting surfaces of their mechanical mountings is a prime requisite in modern practice.

In view of the foregoing, it is an object of the present invention to provide a method and apparatus for reliably and accurately mounting a lens in a lens mounting cell in such a manner that the geometrical axis of the mounting surfaces truly coincides with the optical axis of said lens within extremely close limits.

It is a further object to provide such a method and apparatus which centers the mounting cell to the lens rather than to center the lens to the cell as in the prior art, the mounting cell being bonded to a rotatable spindle during the critical phases of the method for utmost rigidity and dependability of said apparatus.

Another object is to provide such a method and apparatus that the entire alignment operation and finishing of the mounting surfaces may be accomplished at one station on an alignment machine if desired for facilitating increased production.

Further objects and advantages will be found in the arrangement and particular structure of the apparatus used in pursuing the method, reference being had to the specification herebelow taken with the accompanying drawings, wherein.

The steps of the aforementioned novel method are as follows:

STEP 1

A lens of any preferred optical form, i.e., either single or compound, is cemented into a mounting cell without regard to precise alignment of the optical axis thereof with the mechanical axis of the mounting cell.

STEP 2

The lens which is mounted in the lens mounting cell is placed upon an annular seat provided on a vacuum operated chuck which forms part of a rotatable vertically aligned chuck.

STEP 3

Vacuum pressure is applied to the lens to temporarily hold the lower surface thereof securely pressed against the aforesaid annular seat of said chuck.

STEP 4

The aforesaid lens is rotated by the rotatable chuck and during the rotation of the lens its axis is aligned by means of an autocollimator in a position coincidental with the axis of rotation of said chuck.

STEP 5

The contiguous surfaces of the lens mounting cell and said chuck are releasably bonded together.

STEP 6

With the contiguous surface of the lens mounting cell securely bonded to the chuck, both cylindrical and radial mounting surfaces of said lens mounting cell are finished to completed size and shape by means of a suitable machining tool concentrically with the optical axis of the lens.

STEP 7

After the mounting surfaces are finished, the holding flange of the mounting cell is severed and the bond used in securing the mounting cell to the chuck is released.

Figures 1, 2:
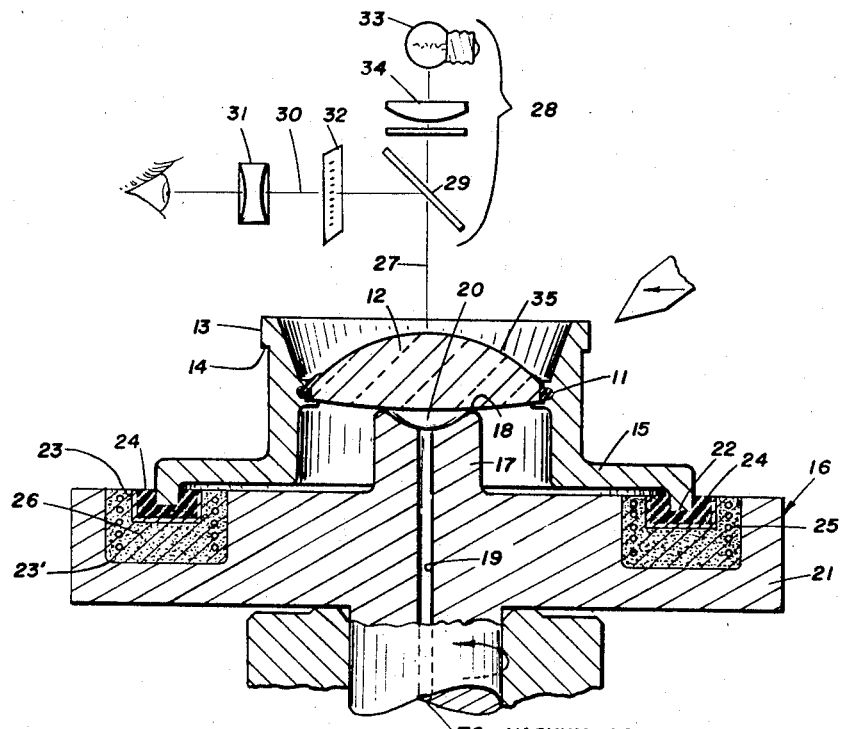
FIG. 1 is a midsectional view of an original lens mounting cell constructed according to the present invention.
FIG. 2 is a midsectional view of the mounting cell held in a rotatable chuck showing one step of said centration method for mounting a lens.
Figure 3:
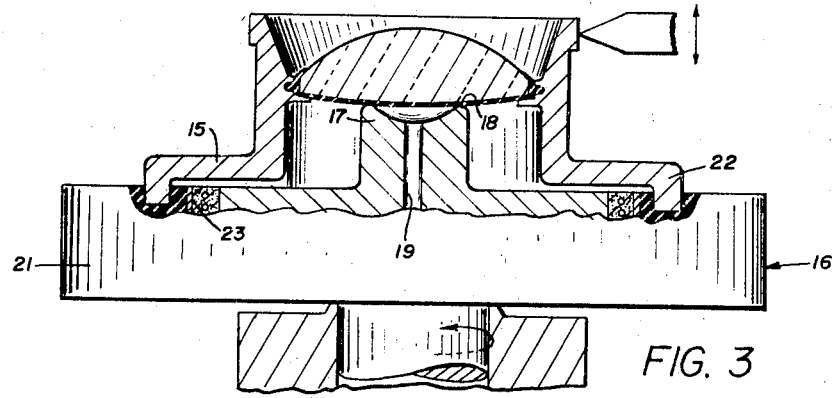
FIG. 3 is a partially midsectional view similar to FIG. 2 showing another step in said method.

With regard to the mechanical apparatus wherewith the above-recited method is practiced, reference is made to FIG. 1 of the drawings wherein a specially shaped lens mounting cell designated generally by numeral 10 is illustrated. Mounted therein in a conventional manner such as cementing at 11, is a typical lens designated 12 having any desired optical form. On the exterior part of the lens mounting cell 10 is formed a cylindrical mounting surface 13 which for the purposes of this invention is made oversize. Said mounting surface 13 terminates at one end in a radial shoulder or mounting surface 14 which is also oversize so as to permit a subsequent finishing step as noted in the foregoing method.

One of the distinctive novel features of said apparatus resides in the cooperative structure of the adjacent parts of the lens mounting cell 10 and a rotatable chuck generally designated by numeral 16 whereby a solid or rigid connection may be temporarily provided therebetween as noted in the above-recited method while the mounting surfaces 13 and 14 are being machined. In the preferred form of the invention, said connection is partly provided by a lateral or radial flange 15 which is formed on the rear or lower portion of said mounting cell 10, and partly by a radial flange portion 21 which is formed on the chuck 16 in a position substantially parallel to and close to the flange 15 of the cell as described hereinafter. Said chuck 16 is provided centrally with a forwardly projecting boss 17 whereon an annular lens seating surface 18 is formed to hold the lens 12 while it is being aligned as mentioned in the above outline of the method. Through the center of the boss 17 and extending axially thereof is provided an opening 19 through which vacuum pressure is established in the closed space 20 existing beneath lens 12 adjacent to the lens seat 18. As illustrated in FIG. 2 of the drawing, the radial flange portion 21 is thick and extends radially outwardly of the boss 17.

For securing the lens cell 10 solidly or rigidly on the chuck in whatever aligned position is found necessary while the mounting surfaces 13 and 14 are machined, preferably the securing means comprises an axially directed cylindrical rim 22 which is formed rearwardly on the peripheral portion of the radial flange 15. Said peripheral rim 22 projects a substantial distance toward flange portion 21 and an annular side recess 23 is formed in the radial portion 21 of the chuck 16 wherein the rim 22 projects when in assembled position. The axis of said chuck 16 is vertical so that the recess or annular chamber 23 is held horizontal and in recess 23 is retained a heat liquifiable bonding substance which is transformed into a liquid at some critical practical temperature. Preferably it should be some rigid heat transformed material 24 such that it will change to a liquid at a temperature substantially below 230° F. and upon subsequent cooling to the solid state will have a low shrink factor of 2% or less. Such a material is found, for instance, in the organic wax known in the trade as PX-140 manufactured by Bausch & Lomb Incorporated of Rochester, N.Y.

The invention comprehends the use of other so-called bonding or holding materials which are converted from a solid to a liquid state by either the addition or removal of heat, such materials including low-melt metal alloys. The bonding agent furthermore may conceivably be a powdered magnetic material which may be compacted by the action of a magnetic field, not shown in the drawings.

In order to supply the heat for liquidizing the bonding material 24, electric heating means may be located around said material to supply the heat either by conduction or induction. Preferably an annular electric coil 25 is provided in a position surrounding the recess 23. Said coil 25 is mounted in a wide annular recess 23' formed in the front face of the flange 16, and both the container for the liquifiable material 24 and the vessel or shell 23 which contains it are packed in a suitable insulation 26 along with the electrical heating coil 25. The arrangement of coil 25 and the container 23 of the fluid material are exemplary only and may assume any one of a number of shapes and designs. In any case, the peripheral rim 22 on the lens mounting member 10 projects axially downwardly a considerable distance to effectively immerse in the bonding material 24 during the period when the above-recited steps No. 2 through No. 6 are being carried on.

With regard to the conduct of the aforesaid method, as soon as the lens 12 has been properly aligned in accordance with step No. 4 on the chuck, the current in the electrical coil 25 is deenergized then the so-called bonding material quickly cools into a solid state wherein the bonding material 24 strongly adheres to or bears against the peripheral rim 22.

In order to determine the alignment of the optical axis 27 with the mechanical axis of the rotating chuck 16 during step No. 4, an autocollimator optical alignment device generally designated by the numeral 28 is provided as shown in FIG. 2, said autocollimator being preferably permanently set up and arranged as a permanent part of the alignment mechanism. In the usual manner the autocollimator consists of a beam splitter 29 which is obliquely arranged on the axis 27 laterally of said beam splitter on the lateral portion of the axis 30 in alignment with an eyepiece 31 and a transparent optical scale 32. A lamp is provided at 33 on the axis 27 and the light coming therefrom is condensed by a suitable condenser lens 34 so that light from the lamp traverses the beam splitter and impinges upon the front surface 35 of the lens 12. The reflection of the light from the surface 35 reflects back along the axis 27 and is truly in coincidence with the mechanical axis of rotation of the chuck 16 so that it is seen by an observer by use of the eyepiece 31. Departure from true optical alignment is evidenced by the appearance of a small point of light off axis on the scale 32.

Figure 4:
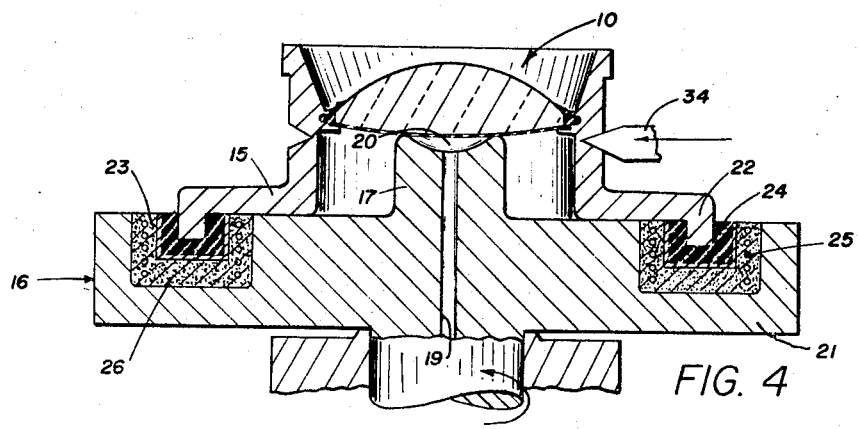
FIG. 4 is a view similar to FIG. 3 showing a still further step in said method.

After the final machining of the lens cell mounting surfaces 13 and 14 (step No. 7), and while the bonding material 24 is yet solid, a separation tool 34 is used to cut the mounting member 10 away from the flanged portion 22 thereof as shown in FIG. 4. Following the severance of the front part of the lens mounting cell 10 from its flange portion 22 the stub portion of the lens mounting cell is discarded by releasing the bonding or holding substance 24 by means of reenergizing the heating coil 25 so that said substance 24 is brought into fluid or semifluid condition.

Figure 5:
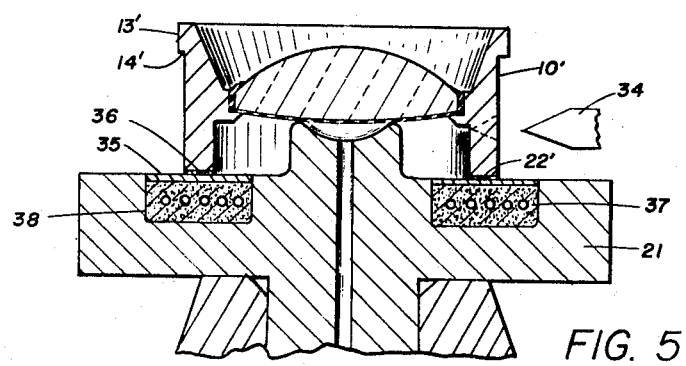
FIG. 5 is a midsectional view of a modified form of the present invention.

It will be understood as aforesaid that many small modifications of the apparatus described above may be introduced without departing from the spirit of the invention as set forth in the particular mechanism above described, all of which will follow exactly the prescribed steps of the method here disclosed. One of the modifications relates to the shape of the holding flange 22 in the peripheral part of the mounting cell. Such a modified form is shown in FIG. 5 wherein a radial rear face 22' is provided on the lens mounting cell 10'. The rear face 22' is secured by adhesion by an operation such as soldering or cementing onto a heat transfer plate 35 which extends radially along the flange portion 21 of the rotatable spindle so as to be in contact with the mounting face 22'. Since the spindle of the chuck is disposed in a vertical direction, it is possible to solder or otherwise adhere at 36 as shown in FIG. 5 in such a way that the lens mounting cell 10' is securely held on the spindle during the time that a suitable turning tool is used to finish turning the mounting surfaces 13' and 14' of the lens mounting cell 10'. Release of the adhesive bond is effected by providing an electric heating coil 37 which is embedded in a suitable insulating material contained within a suitable recess 38 formed in the face of the rotating spindle.

Although only certain forms of this invention have been shown and described in detail, it is within the scope of this invention to provide other modified forms within the scope of the claims recited herebelow.

I claim:

1. A precise method for mounting a lens in a lens mounting cell having oversized mounting surfaces so that its optical axis is concentric with its finished mounting surfaces, said method comprising the steps of:
   cementing a lens into a mounting cell,
   placing an exterior surface of said lens on an annular lens seat formed on a rotatable spindle,
   holding said lens on said seat temporarily with vacuum pressure,
   aligning the optical axis of the lens in coincidence with the rotation axis of said spindle,
   releasably bonding a surface of said cell to an adjacent surface of said spindle,
   machining off said mounting surfaces to finished dimensions, and
   releasing the bond between said cell and said adjacent surface.

2. In apparatus for centering to each other the mechanical and optical parts of a lens mounting, the combination of:
   a lens mounting cell wherein a lens is secured,
   a rotatable vertical machine spindle having a lens chuck on which said lens is held to be centered thereon,
   a flange portion formed radially on said spindle adjacent to one end of said cell, and
   means operatively constructed on said cell and flange portion for temporarily bonding the cell and flange portion together while the exterior mounting surfaces of the cell are machined concentrically with the axis of said spindle.

3. An apparatus as set forth in claim 2 further characterized by:
   said means including a pair of concentric and spaced circular surfaces formed in said flange portion so as to provide an annular recess therein facing said cell, an annular rim peripherally formed on said cell and engaging freely within said recess, and
   rim holding material held in said recess in contact with said rim.

4. Apparatus for precisely centering to each other the mechanical and optical parts of a lens mounting, said apparatus comprising the combination of:
   a lens mounting cell and a lens fixed therein,
   a rotatable vertical machine spindle and a lens chuck fixed on the upper end thereof, said lens resting on the chuck with freedom to move its optical axis into coincidence with the axis of rotation of said spindle,
   an autocollimator aligned with the axis of said spindle to align said lens therewith,
   a flange member formed radially on said spindle below and adjacent to said lens cell,
   a longitudinal rim formed on the lower part of said cell and projecting into contiguity with said member, and
   a releasable bonding agent which is adhered to both said rim and member after the optical and mechanical axes are made coincident so that a driving connection is formed therebetween,
   whereby the mounting surfaces of said cell may subsequently be machined concentrically with the axis of said spindle and the rim may be cut off from the cell to free the cell.

5. Apparatus for precisely centering to each other the mechanical and optical parts of a lens mounting, said apparatus comprising:
   a lens mounting cell and a lens fixed therein,
   a rotatable vertical machine spindle and a lens chuck fixed on the upper end thereof, the lens resting on the chuck and having freedom for aligning its optical axis in coincidence with the axis of rotation of said spindle,
   a flange member formed radially on the chuck of said spindle below said lens cell,
   a longitudinal rim formed concentrically and axially on the lower part of said cell and projecting into close proximity with said flange member, said rim being substantially larger in diameter than said cell,
   a pair of concentric surfaces formed in the flange member so as to define the edges of an annular horizontal recess facing said cell in said member, one surface being larger and the other smaller in diameter than said rim so that said rim engages freely in said recess, and
   a heat liquifiable bonding material filling said recess and forming a driving connection with said rim when cool whereby the mounting surfaces of said cell may be subsequently machined concentrically with the axis of said spindle, and the rim may be cut off from the cell.

6. Apparatus as set forth in claim 5 wherein said bonding material is a wax which changes from a solid to a liquid between substantially 140° F. and 230° F., and has a shrink factor of less than 2.0%.

References Cited

UNITED STATES PATENTS

| 2,765,523 | 10/1956 | Vaughan | 29—406 |
| 3,078,559 | 2/1963 | Thomas | 29—424 X |
| 3,176,387 | 4/1965 | Argueso et al. | 29—423 |

THOMAS H. EAGER, *Primary Examiner.*

U.S. Cl. X.R.

29—200, 423, 424; 350—178